No. 896,816. PATENTED AUG. 25, 1908.
H. C. FARRIS.
HARROW CULTIVATOR.
APPLICATION FILED JUNE 9, 1908.
2 SHEETS—SHEET 2.
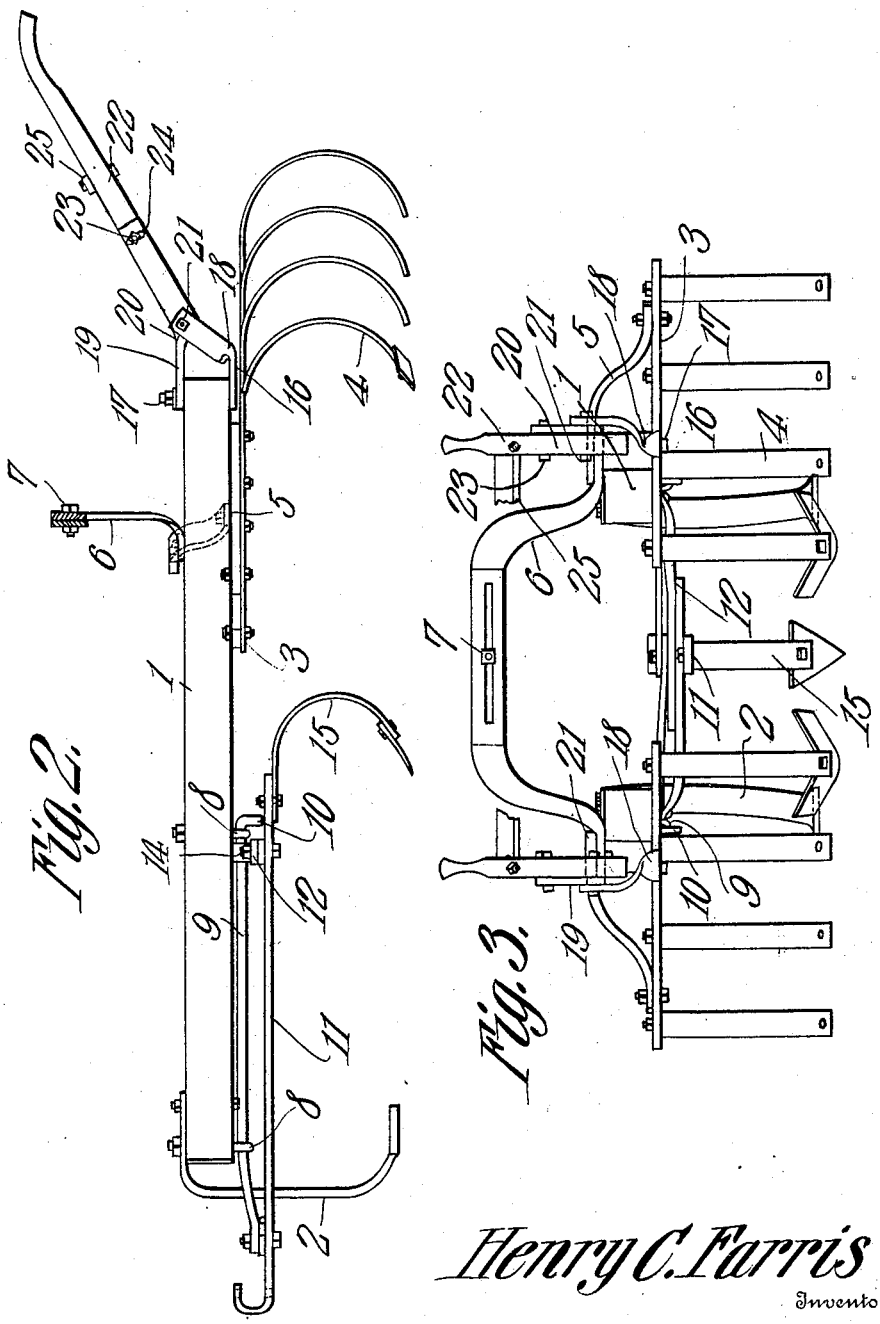

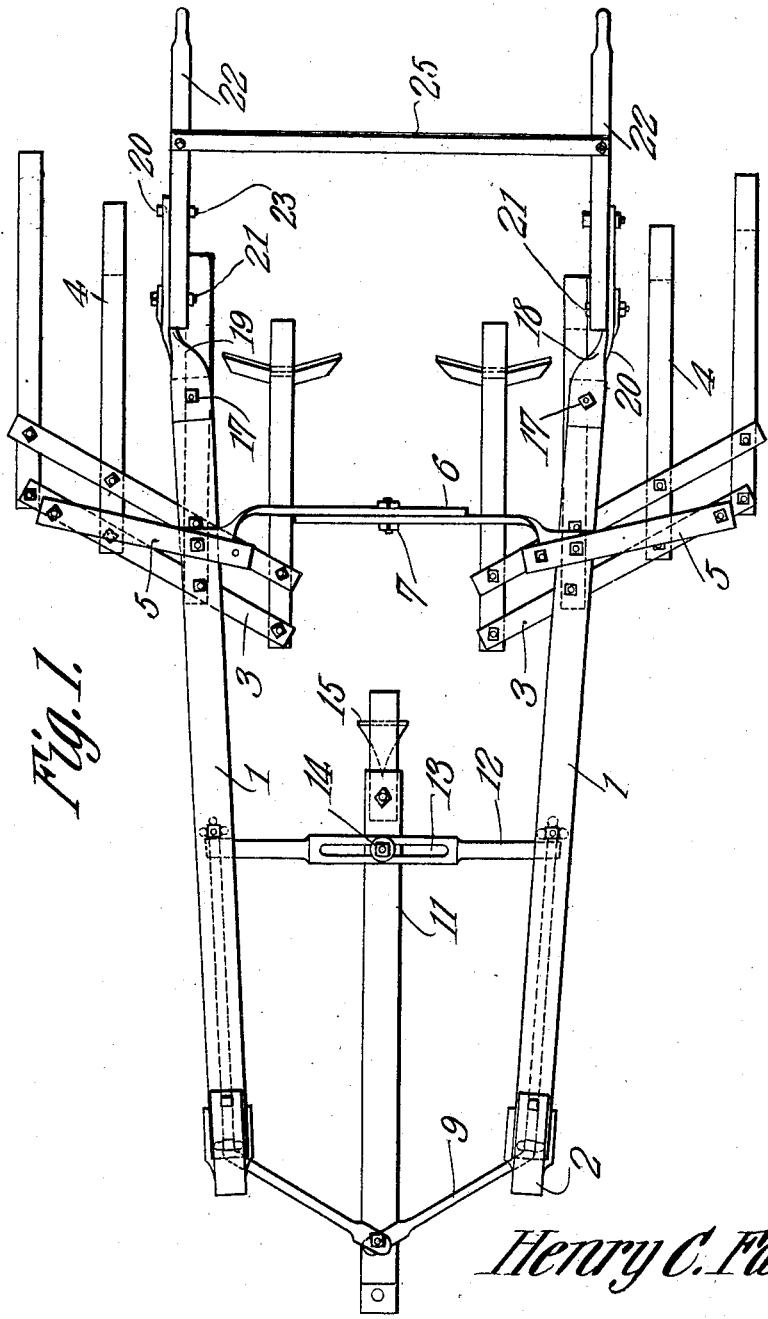

UNITED STATES PATENT OFFICE.

HENRY C. FARRIS, OF QUITMAN, TEXAS.

HARROW-CULTIVATOR.

No. 896,816.　　　　Specification of Letters Patent.　　　Patented Aug. 25, 1908.

Application filed June 9, 1908. Serial No. 437,547.

*To all whom it may concern:*

Be it known that I, HENRY C. FARRIS, a citizen of the United States, residing at Quitman, in the county of Wood and State of Texas, have invented a new and useful Harrow-Cultivator, of which the following is a specification.

This invention has relation to harrow cultivators and it consists in the novel construction and arrangement of its parts as hereinafter shown and described.

The object of the invention is to provide an implement of the character indicated which may be used for cultivating the soil at the opposite sides of a row of standing plants.

The implement consists primarily of side parts which are adjustably connected together and which are provided with a common draft bar. Each side part comprises a beam which is pivotally connected at its forward end with the draft bar and which is provided with means for securing the same in a fixed position with relation to the said draft bar. Runners are mounted at the forward end of the beams. Soil engaging members are carried by the rear end portions of the beams and each beam is provided with a semi-arched arm and the said arched arms may be secured together whereby the implement may be operated as a straddle row cultivator. If however, it is desired to use the implement as a harrow or between adjacent rows of standing plants an earth engaging member may be mounted upon the rear end of the draft bar. Each beam is provided at its rear end with a handle which may be adjusted both horizontally and vertically with relation to the beams.

In the accompanying drawings:—Figure 1 is a top plan view of the cultivator. Fig. 2 is a sectional view of the same, and Fig. 3 is a rear end view of the same.

As the harrow cultivator consists of two side parts of similar construction a description of one of the said side parts will answer for both.

Each side part comprises a beam 1 to the forward end of which is attached a runner 2, a frame 3 is pivotally mounted at the rear end portion of the beam 1 and the teeth 4 are carried by the frame 3. Said teeth may have pointed lower ends or some of them may be so shaped while others may be adapted to receive and support plow sweeps of ordinary construction or plow wings as desired. An arm 5 is pivotally connected at its outer end to the outer portion of the frame 3 and the inner end of said arm is adjustably connected with the beam 1 and forms a brace for strengthening the frame 3 in an adjusted position with relation to the beam 1. A slotted semi-arched arm 6 is also attached to the beam 1 and the arch arms of the beams at the opposite side of the implement are connected together by means of a clamp bolt 7 which passes transversely through the slot in the said arch arms.

Each beam 1 is provided upon its under side and in the vicinity of its forward end with the downwardly disposed eyes 8. The rod 9 is pivotally mounted in the eyes 8 and is provided at its rear end with a hook 10 which is adapted to engage the rear eye 8 carried by the beam 1.

The forward end portion of the rod 9 is obliquely disposed with relation to the longitudinal axis of the beam 1 and the forward ends of both of the rods 9 are pivotally connected with the draft bar 11. The said bar 11 is located in a line equi-distant between the beams 1, and is provided at its forward end with beams for attachment with a single or double tree. The link 12 is pivotally connected at its outer end to the rear end portion of the rod 9 and is provided at its inner end portion with an elongated slot 13. The inner ends of the links 12 are adapted to overlap each other and are secured together by a bolt 14 which passes transversely through the slots 13 of the said links and also through a perforation in the rear end portion of the draft bar 11.

By this arrangement it will be seen that by loosening the bolts 7 and 14 that the beams 1 may be swung laterally with relation to each other upon the pivotal connection between the rods 9 and the draft bar 11 as a pivot. When the said beams have been adjusted laterally to the desired extent they may be secured in such adjusted position by tightening of the bolts 7 and 14. Thus the forward ends of the beams are held in adjusted position by the links 12 and the rear portions of the beams are held in adjusted positions by the arch arms 6. By providing such adjustment the implement may be conveniently used as a straddle row cultivator and the earth engaging members may be caused to operate upon the soil at any desired distance from the row of standing plants. When however, it is desired to use the implement for cultivating the soil between rows or for harrowing the surface of the soil, an earth engaging member 15 may be attached to the rear end portion of the draft bar 11 and the said member 15 will cooperate with the earth engaging members carried by the frame 3.

A plate 16 is pivotally mounted at the rear end of each of the beams 1 and may swing horizontally with relation thereto when the bolt 17 is loosened. The said bolt 17 passes vertically through the beam 1 and the plate 16 is twisted at an intermediate point as at 18, so that its end portions occupy planes at right angles to each other. The plate 16 is connected with the beam 1 at the under side thereof. The arm 19 is pivotally attached with the upper side of the beam 1 by the bolt 17, and is twisted at an intermediate point as at 20. The bolt 21 passes transversely through the lower end of the handle 22 and also through the plate 16 and arm 19. The handle 22 is provided with a second bolt 23 which passes through the slot 24 provided in the end of the arm 19. By this arrangement it will be seen that by loosening the bolt 17 the handle 22 may be swung horizontally or substantially so and by loosening the bolt 23 the handle may be swung vertically or substantially so. After the handles 22 have been properly adjusted they may be secured in their adjusted positions by tightening the nuts carried by the bolts 17 and 23. The cross bar 25 connects the handles 22 together and holds their rear end portions at a proper distance apart.

Having described my invention what I claim as new and desire to secure by Letters-Patent is:—

1. An implement as described comprising side parts each consisting of a beam supported at its front and rear ends by ground engaging members, eyes located under the forward portion of the beam, a rod passing through the eyes and having its rear end hooked, a link pivotally connected to the rod, an arm attached to the rear portion of the beam, means for adjustably connecting the arms of the beams together, and a draft bar to which the rods are pivotally connected and the links are adjustably connected.

2. An implement as described comprising side parts each consisting of a beam supported at its front and rear ends by ground engaging members, said beams being laterally adjustable with relation to each other and means for holding the beams in adjusted positions, a handle carried by each beam, said handles being adapted to be swung vertically and also laterally with relation to the beams and means for fixing the handles in adjusted positions.

In testimony that I claim the foregoing as my own, I have hereto affixed my signature in the presence of two witnesses.

HENRY C. FARRIS.

Witnesses:
J. S. OGLE,
W. R. GOODWIN.